June 13, 1967 J. R. BACON 3,325,802

COMPLEX PATTERN GENERATION APPARATUS

Filed Sept. 4, 1964 2 Sheets-Sheet 1

Fig. I

INVENTOR.
JAMES R. BACON

BY Carl Fissell Jr.
AGENT

INVENTOR.
JAMES R. BACON
BY
Carl Fissell Jr.
AGENT

United States Patent Office 3,325,802

Patented June 13, 1967

3,325,802

COMPLEX PATTERN GENERATION APPARATUS

James R. Bacon, Philadelphia, Pa., assignor to Burroughs Corporation, Detroit, Mich., a corporation of Michigan Filed Sept. 4, 1964, Ser. No. 394,495
15 Claims. (Cl. 340—324)

The present invention relates to complex pattern generating apparatus, and more particularly, although not necessarily exclusively, to apparatus for generating symbols such as vectors, maps, graphs, and the like for display or other purposes. With still more specificity, the present invention has to do with line generating apparatus which is capable of forming a closed symbol, outline or other representation, such for example, as an outline of a map of a particular geographical location, country, state, county, etc., or for the generation of other unusual or closed symbols. Still more particularly, the invention has to do with complex pattern generation apparatus including control circuitry for controlling the deflection of a cathode ray tube beam so as to effect a predetermined trace direction and for controlling the intensity of such beam in a manner to effect constant illumination of the line, symbol, character, or other closed complex waveform on the cathode ray tube face.

It is an object, therefore, of the present invention to provide electronic apparatus for generating substantially straight line segments for display by means of a cathode ray tube.

It is another object of the present invention to provide line generating apparatus including means for producing substantially straight line segments of constant illumination.

Another object of the present invention is to provide line generating apparatus for writing all line segments at the same writing velocity, thereby assuring the same brightness for all segments of such lines.

Still another object of the present invention is the provision of an electronic system for producing straight line movement of the cathode ray beam between two precisely located points in accordance with information supplied from a digital computer.

It is also an object of the present invention to provide line generating apparatus wherein registers and digital to analog converters are provided for the initial XY starting point of the line to be generated and wherein registers and digital to analog converters for the change in X and Y are provided, so that the components of the line to be generated are received into the registers and converted to an analog voltage in the D to A converters, in a manner such that the analog voltages are summed and fed to deflection amplifiers moving the beam of electron across the face of the cathode ray tube.

Still a further object of the invention is the provision of line generating apparatus including means for adding the change in X and Y to the initial XY coordinate to form a new base point for the line being generated, thereby up-dating the line generating signal from point to point on the display and avoiding symbol closure error.

In accordance with the foregoing objects and first briefly described, the present invention comprises electronic apparatus for generating an accurate line on the face of a cathode ray tube or other similar electronic device and includes a plurality of registers and digital to analog converters for the initial XY starting point of the line to be generated. Also included in the apparatus are registers and digital to analog converters responsive to changes in X and Y relative to the line being generated. The components of the line generated are received into the registers and converted to an analog voltage in the D to A converters. The analog voltages are then summed and fed to deflection amplifiers for moving the beam of electrons across the face of the cathode ray tube. Each change in X and Y is added to the initial XY coordinate to form a new base point for the line being generated. Each new change in X and Y is then added to this new base point to progressively generate and advance the line. The starting point of the line being generated is referenced to a voltage generated in the system which is proportional to the newly derived values of X and Y. At the end of the line generation, the display on the face of the cathode ray tube is blanked by a signal from a blanking amplifier which is keyed by the aforementioned reference voltage.

These and other objects, features and advantages of the present invention will become more apparent from the following detailed description taken together with the appended claims and accompanying drawings, in which:

The generation of straight line segments for display on a cathode ray tube or other electronic display apparatus involves a number of different problems, two of which are basic to the display per se. The first is the assurance that the line segments generated will be substantially straight and the second is that the apparatus must be able to write all line segments at the same writing velocity, thus assuring the same brightness for all such segments. The apparatus, as hereinafter described, includes means for generating line segments which are straight lines and which are written at substantially constant velocity.

Figure 1:
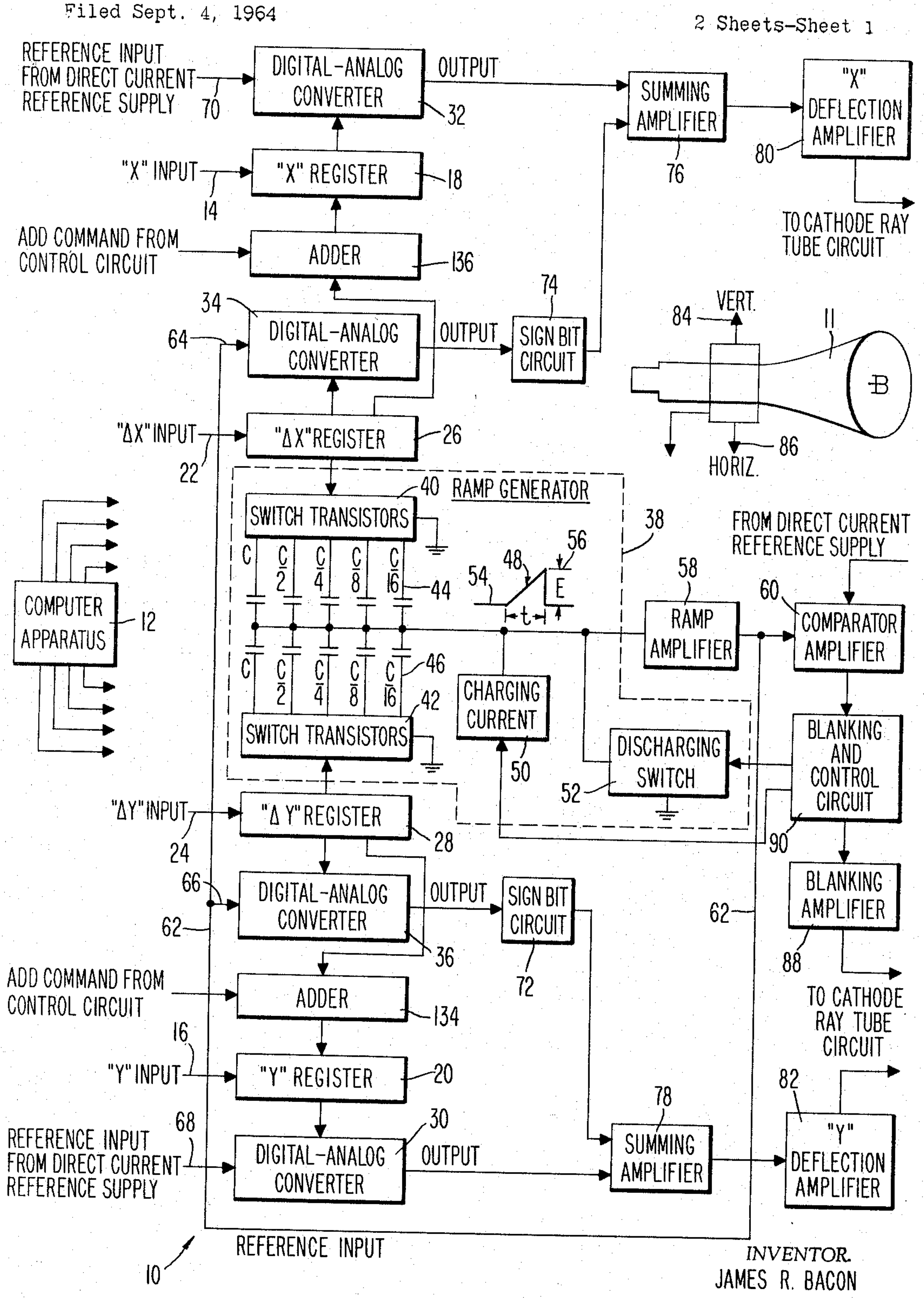
FIG. 1 is an illustration of a preferred embodiment of electronic apparatus incorporating the invention.

Referring first to FIG. 1, there is shown a block diagram of complex waveform generation apparatus 10 embodying the present invention wherein the hereinabove described problems are solved in a new and novel manner. A visual display, which may take the form of letters of the alphabet, map outlines, figures, numbers, etc. is adapted to be formed on the faceplate of a display cathode ray tube 11, having a phosphor of sufficient persistance and decay to afford reasonable viewing time.

Digital information is supplied to the apparatus of FIG. 1 from digital computer apparatus 12 and is forwarded in two parts to the line generating apparatus 10 as the initial X and Y position information and as the components of the line to be drawn as $\Delta X$ and $\Delta Y$ information. The first of these bits of information are introduced into input terminals 14, 16 of respective X and Y registers 18 and 20. The line segment information is fed to the delta X and delta Y inputs 22 and 24, respectively of $\Delta X$ and $\Delta Y$ registers 26 and 28. The latter being the horizontal and vertical components of the vector as hereinafter described, which together define the magnitude and direction of the line being drawn. The magnitude of the line is $\sqrt{\Delta X^2+\Delta Y^2}$, while the direction is tan–1 $\Delta Y/\Delta X$.

The outputs of the X and Y registers 18 and 20 are fed to respective D to A converters 30 and 32 e.g. ladder network type while the outputs of the $\Delta X$ and $\Delta Y$ registers 26 and 28 are fed to $\Delta X$ and $\Delta Y$, D to A converters 34 and 36, respectively. The two sets of digital to analog converters produce an analog output signal for purposes hereinafter described.

The delta X and delta Y information from respective registers 26 and 28 is utilized to control ramp generator apparatus here shown enclosed in dotted outline 38 including two sets or banks of switch transistors 40 and 42 which in turn are used to "set up" or charge a plurality of capacitors disposed for the sake of utility in two banks 44 and 46 identified further as $c$, $c_2$, $c_4$, $c_8$, and $c_{16}$.

One capacitor C is used for each bit of ΔX and ΔY. Since, in the apparatus herein described, there is a requirement for 5 bits in each ΔX and ΔY there are 10 capacitors. The number of bits determines how accurately the apparatus can resolve any vector to a given length and angle. Capacitors 44 and 46 determine the rate of rise of a ramp of voltage 48 which is obtained by drawing a charging current from a source of charging current 50 (e.g. transistor constant current source) through selected capacitors in the banks 44 and 46. The capacitors are discharged by means of a discharging switch 52. The charging current is initiated in a linear manner as at 54 and approaches a peak voltage E as at 56. The ramp or voltage is amplified by ramp amplifier 58 for purposes hereinafter described. The height of voltage E, i.e. the upper end point of the ramp, is determined by a comparator amplifier 60 which derives its potential from a D.C. reference supply referred to in the upper and lower left portions of FIG. 1.

The comparator amplifier 60 takes the ramp from ramp amplifier 58 and compares it against the D.C. reference voltage from the D.C. reference supply applied to the X and Y, D to A converters 30 and 32. When the comparator has sensed that the ramp has reached the reference voltage, its maximum point E, it changes states and this level change causes the discharge switch 52, e.g. a transistor switch, to short the input of the ramp amplifier (which is also the output point of the ramp generator) to ground, resetting the ramp generator 38 back to zero volts until a new word bit comes along. Simultaneously, all those capacitors 44 and 46 which were initially placed in circuit are discharged. The amount of capacitance selected is proportional to the length of the vectors delta X and delta Y which are themselves components of a common or resultant vector V, FIG. 3, e.g. components of a line segment.

Figure 3:
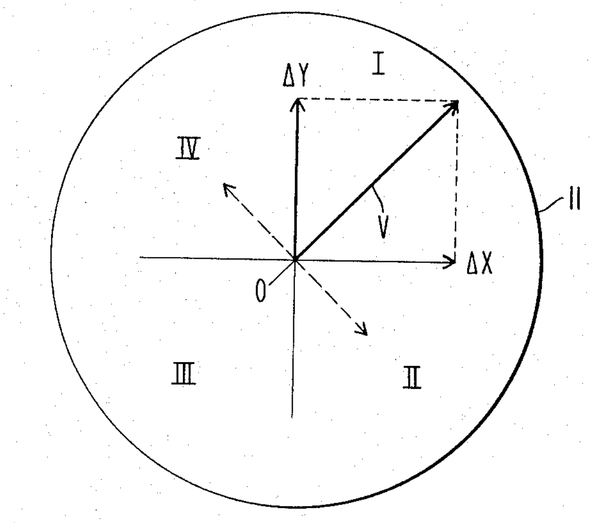
FIG. 3 is a diagrammatic representation of a cathode ray tube raster showing the four quadrants into which the display ideally is divided.

FIGURE 3 represents an idealized diagrammatic view of a CRT viewing screen, divided for the sake of illustration and explanation into four quadrants labeled I, II, III and IV, respectively. Any vector V in an X–Y plane can be resolved into two components. Assuming that the vector V is drawn from origin 0 these components will be the horizontal or delta X (ΔX) and the vertical or delta Y (ΔY). The angle which vector V makes with the horizontal component is equal to the arc tangent of delta Y over delta X and the magnitude or the length of the vector $V_L$ is equal to the square root of delta X squared plus delta Y squared. Effectively, it is the delta X and delta Y components which together and cumulatively (sum) produces the actual line segment desired as will become more apparent hereinafter.

In order that all lines be drawn with the same brightness on the display cathode ray tube (DCRT) they must be drawn at the same velocity. This means that a shorter line segment and a longer line segment, to be drawn at the same velocity, must be drawn at different times. The short line must be drawn in a much shorter time than a long line segment. Since distance equals velocity times time and since it is desired to keep velocity constant then the distance must be proportional to the time or vice versa. The ramp, generated in the manner aforesaid, is amplified by the ramp amplifier 58, the output of which over line 62 is employed as a D.C. ramp reference voltage for the ΔX and ΔY converters to which it is fed over lines 64 and 66 respectively. A ference level is likewise applied from a D.C. reference supply to the X and Y, D to A converters over lines 68 and 70 respetcively.

The output of converters 34 and 36 are $E_{ref}$ K delta X and $E_{ref}$ K delta Y, respectively, where $E_{ref}$ is the reference input to the converter and K is a constant of proportionality. If $E_{ref}$ is a ramp, that is E$t$, then the output signals are E$t$ΔX and E$t$KΔY, respectively. Signals are then fed through sign bit circuit apparatus 72 and 74 to the X and Y summing amplifiers 76 and 78 for application to X and Y deflection amplifiers 80 and 82. These signals, through the vertical and horizontal deflection apparatus 84 and 86, will cause a straight line to be drawn on the face of the cathode ray tube, DCRT. The slope of this line will be $$\frac{\text{EtK delta } Y}{EtK \text{ delta } X}=\frac{\text{delta } Y}{\text{delta } X}$$

at all points along the line. The brightness, and therefore the velocity of this line, must be independent of angle and magnitude. This velocity is given by $$V=\sqrt{\frac{\Delta X^2+\Delta Y^2}{t}}$$

Keeping velocity constant the time to draw the line is given by $$T=\sqrt{\frac{\Delta X^2+\Delta Y^2}{V}}$$

or $t\approx\sqrt{\Delta X^2+\Delta Y^2}$ if V is constant. This term can be approximated by $t\approx\Delta X+\Delta Y$. This approximation causes a worse case error at angles of 45 degrees. The ratio of correct brightness to actual brightness will be .707:1 at this angle. This is well within acceptable tolerance.

To produce an E$t$ whose rate is proportional to delta X plus delta Y, each bit of the delta X and delta Y registers 26 and 28 is used to drive the transistor switches. These switches are used to return the capacitors to ground, the capacitors being weighted to the bits of the register. Thus, the most significant bit returns capacitor C to ground, the next bit returns capacitor $C_2$ to ground etc. The total capacitance returned to ground is now proportional to delta X plus delta Y. This total capacitance is made available at the time the generation of the desired line is to start. The charging current causes a voltage to be produced on the capacitors at a rate proportional to delta X plus delta Y. This ramp of voltage continues to increase until the comparator 60, as seen in FIG. 1, senses that the $Et=E_{ref}$, where $E_{ref}$ is a D.C. reference voltage. A signal from the comparator 60 through the blanking and control circuit 90 and the blanking amplifier 88 blanks the CRT beam and also causes the blanking and control circuits 90 to discharge the capacitors through the discharge switch 52. New delta X and delta Y information is then received from the computer and the new line segment is generated. It is, of course, noted that the linearity of the line drawn is independent of the linearity of the ramp of voltage which is generated. Non-linearity of this ramp causes only variations in brightness along the line.

The foregoing operation results in the generation of individual line segments. In order that these segments form a continuous symbol, drawing etc., the X and Y registers 18 and 20 are used. The computer 12 puts the initial starting point for the drawing into these registers. These registers are connected to digital to analog converters 30 and 32 having a D.C. reference. The output of these converters are $E_{ref}$KX and $E_{ref}$KY, respectively. These outputs are summed with the outputs of the delta X and delta Y converters. This will cause a line segment to be drawn from the point XY to the point X plus delta X, Y plus delta Y. At the end of the drawing of one line segment, the control circuitry commands adders 134 and 136 to add the contents of delta X to the X register and delta Y to the Y register. The X and Y registers then contain X plus delta X and Y plus delta Y information. The new delta X and delta Y information is then inserted into the delta X and delta Y registers. Another line segment is generated and at the end of this line segment the add signal again updates the X and Y registers as before. It is seen that this system as set forth hereinabove, enables the computer to have complete control over the long term accuracy of the drawing. The point at which any line segment begins is as accurate as the contents of the X and Y registers. Their accuracy is dependent only on the computer accuracy.

Sign information for the delta X and delta Y coordinates is necessary in order to allow lines to be drawn in all four quadrants of the DCRT from a given start point. This is accomplished by controlling the polarity of the ramp voltage E at the reference output from the delta X and delta Y digital to analog converters 34 and 36. The sign bit circuitry 72 and 74 which accomplishes this, as will be described in detail hereinafter, includes a precision operational inverting amplifier for both the delta X and delta Y channels. The amplifier has unity gain and 180 degree phase shift and is either used or not used according to the sign bit information. When it is used it inverts the applied signal, when it is not used the signals by-pass it. The ramp voltage is fed to the D to A converters 34 and 36 and the output from these converters are fed to the sign bit circuits 72 and 74 respectively. The sign bit circuits either invert the output waveform from the D to A converters or pass this waveform without inversion as determined by the respective sign bit command.

If it is desired to draw the vector V in the first quadrant I, FIG. 3, then both of the sign bits must be non-inverted i.e. the ramp that comes from the ramp generator 38 through the ramp amplifier 58 comes into the sign bit circuits 72, 74 and simply passes through them without being inverted. If, however, it is desired to draw the vector in the second quadrant then the delta X component does not have its direction changed by the sign bit circuit, but the delta Y component does, so it becomes a minus delta Y in the sense of the delta Y being an absolute value. Thus, the sign bit circuit 72 for the delta Y side takes the ramp from the ramp generator 38 and inverts it 180°. In the third quadrant III, both the delta X and the delta Y information ramp is inverted by the sign bit circuits 72 and 74.

In the fourth quadrant the delta X information is inverted, but the delta Y information is not inverted. Once more this is accomplished by the sign bit circuits.

The digital to analog converters 34 and 36 can be considered to be digitally controlled attenuators which take a ramp in and put a ramp out whose amplitude is dependent upon the digital signal coming from the delta Y or the delta X registers 26 and 28, as the case may be. The signal output is unchanged in its overall shape. However, the amplitude is proportional to the delta X or delta Y component of the vector to be drawn.

For example, if the vector were to be drawn along the $\Delta X$ axis, $\Delta Y$ would be zero. In this instance the $\Delta Y$ register would set up the $\Delta Y$, D to A converters such that it did not pass a ramp and thus there would be no output. The $\Delta X$ converter would put out a ramp whose amplitude was dependent upon the length of the vector to be drawn. Here the vector would be drawn along the $\Delta X$ axis. The converse would be the case if the vector were to be drawn along the $\Delta Y$ axis.

Figure 2:
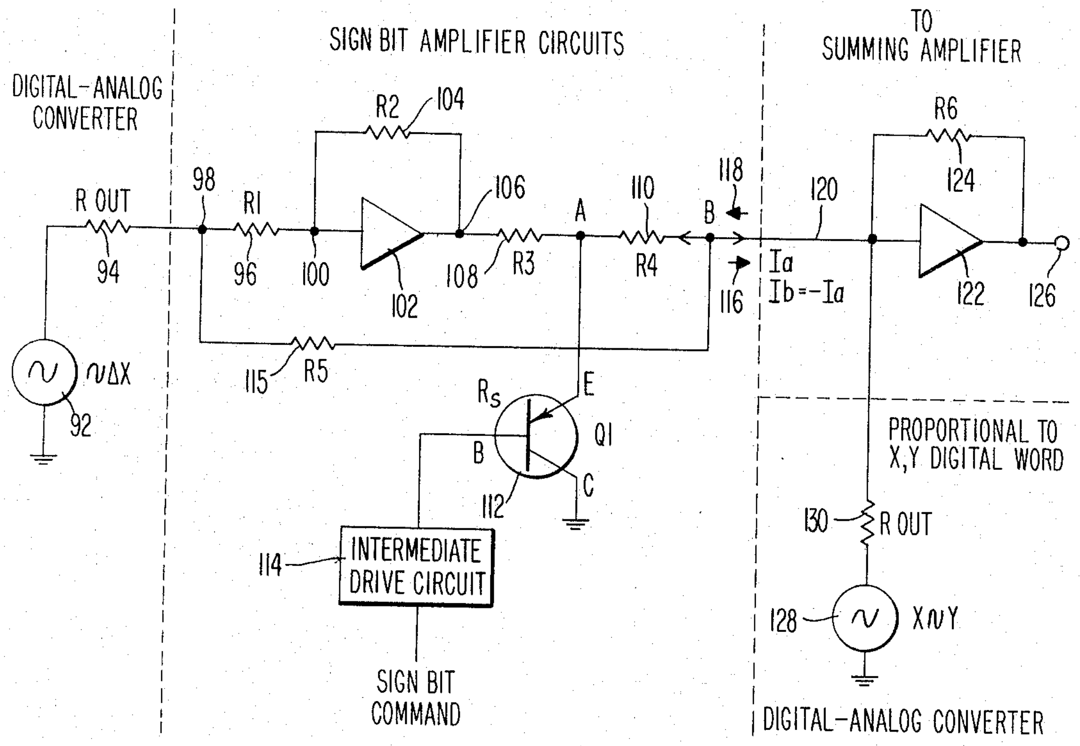
FIG. 2 is a schematic representation of sign bit circuit apparatus employed with the apparatus shown in FIG. 1.

Referring now to FIG. 2 of the drawing, wherein the diagrammatic illustration of a sign bit circuit representative of that which is included in each of the sign bit circuits 72 and 74 is shown, it is seen that the sign bit circuit is connected to the output side of digital to analog converters 34 and 36. The digital to analog converter is illustrated as an equivalent circuit including a voltage generator 92 the output of which is proportional to the delta X or delta Y word in series with a resistance 94 here identified as "R out" the effective output impedance of the D to A converter. The output of the D to A converter thus may be considered as a voltage generator in series with a resistor.

This phraseology is employed by way of analogy and in further explanation thereof such analogy is commonly called a Thevenin equivalent. Normally such equivalents are applied to small circuit sections in which the circuit is looked upon as a generator in series with some impedance. In the present instance the output of the D to A converter has been Theveninized in the sense that when you look back into the circuit at the series resistance, the series resistance seen is always the same regardless of what the digital input of the D to A converter actually is, i.e., the series resistance is always a constant equal to R and identified as $R_{out}$, which is the effective output impedance of the D to A converter. In series with this $R_{out}$ is a voltage generator. This voltage generator is equal in amplitude to a ratio based on the digital word in and on the value of the reference voltage which is used on the D to A converter. The exact value of voltage is equal to the reference multiplied by the decimal equivalent of the input binary number divided by the full scale decimal value which the D to A converter is capable of producing.

A resistor 96 is connected between the output point 98 of the D to A converter and the input point 100 of a standard operational amplifier 102 of the inverting type. Amplifier 102 uses a feedback resistor 104 connected between the input 100 and the output 106. The output of amplifier 102 is connected through resistors 108 and 110 to the input of respective summing amplifier 76 or 78.

A transistor Q1 112 has its emitter connected to midpoint A while the collector is grounded. The base is connected through an intermediate drive circuit 114 to the sign bit command. Other types of switching devices could be used in this configuration so long as the device is compatible with the speed of the rest of the system. A PNP transistor has actually been used in this circuit configuration. However, an NPN transistor could be used with suitable drive circuitry. The PNP is used in an inverted connection in order to obtain a low saturation characteristic.

A by pass resistor 115 R5 is connected between the junction 98 and the junction point B at the output of the sign bit circuit which junction point forms the electrical output of the sign bit circuit.

Consider first the condition with transistor switch 112 "on" such that the mid point A is grounded. Any signal coming into the amplifier from a D to A converter is amplified thereby. However, the output goes through a divider formed by R3 and the saturation resistance $R_s$ of Q1. This dividing action for all practical purposes causes "0" voltage from the amplifier to appear across the transistor switch. $R_s$ is approximately 4 ohms. The ratio of R3 to $R_s$ is approximately 1,000 to 1. This produces about 60 db attenuation of the output of the amplifier when Q1 is closed. However, current from the D to A converter has a second path through R5 causing it to split or divide at the junction B. Part of it flows toward the summing amplifier arrow 116 i.e. toward the output point of the sign bit amplifier circuits and part of it goes toward R4, arrow 118 attenuating the amount of current from the total coming through R5. The amount of current which leaves the amplifier circuits with switch Q1 closed is called $I_a$.

When Q1 is open, the current coming from the D to A converter once more comes through R5 and R1. It is inverted by the operational amplifier 102. However, since the transistor impedance is relatively high, the current from the output of the operational amplifier 102 flows through R3 and R4 and joins the current coming from R5. Since the current is of the opposite polarity to the current coming through R5 (due to the fact that the operational amplifier inverts) the current which flows to the output is comprised of two parts i.e. the current from R5 and the current in the opposite direction from the amplifier. The gain of the amplifier is adjusted by choosing the value of R2 such that the current $I_b$ which is defined as that current which flows when the transistor switch Q1 is open is equal to minus $I_a$. Therefore, the current which flows from the amplifier circuit is either $I_a$ or minus $I_a$, depending upon the condition of the transistor switch Q1. The condition of switch Q1 is controlled by a sign bit command from the digital computer. The intermediate drive circuit 114 between Q1 and the sign bit command is a standard transistor voltage level shifter. This operates in a manner such that the base current is sufficient for Q1. When Q1 is turned off the base must be raised more positive in order to assure that Q1 will stay off under any conditions of voltage appearing at its emitter, i.e. positive with respect to ground, since the output of the D to A converter is negative. It is to be recalled that the output of the amplifier is positive since it inverts. Therefore, the voltage at A will be positive. Thus, when the transistor switch Q1 is turned off, the base has to be made more positive than A in order to assure that the base to emitter junction of Q1 will be back biased.

The output 120 from the sign bit amplifier circuit goes to a second operational amplifier 122 and connects directly to the summing junction of that amplifier. A feed back resistor 124 disposed as shown and labeled $R_6$ controls the gain of the second amplifier 122. Since the summing junction of an operational amplifier is virtual ground, the output of this sign bit amplifier is at virtual ground therefore the $I_a$ or minus $I_a$ is into this virtual ground. In an operational amplifier the current flowing in the input resistor and the current flowing in the feed back resistor are equal, therefore a current $I_a$ will produce an output at the output 126 of the summing amplifier of $I_a$ times R6. This output is the actual voltage that goes to the deflection amplifiers 80 and 82. The output of the summing amplifier thus effectively forms the output of the pattern or line generating apparatus.

The summing amplifier derives its name from the fact that a second current also comes into its summing junction. This current comes from the X or Y position D to A converter, depending upon what channel is being utilized and described. As before this converter can be shown in an equivalent circuit as a voltage generator 128 in series with a resistor 130. The voltage here is proportional to the X or Y digital word. This output point from the converter also connects to the summing junction of the summing amplifier and this provides the current which causes the summing amplifier to have an output consisting of an X or Y component added to the ramp which comes through from the sign bit amplifier circuits. The value of the resistors 94 and 130 at the output of the D to A converters is the fixed value of resistance for the type of converter that is being used. This is a characteristic of the ladder type digital to analog converter and it is here labeled $R_{out}$.

After the delta Y and delta X information has been put into the register and the ramp has been drawn, and if the figure that is being drawn on the cathode ray tube is a continuous closed figure, then the X and Y registers must be "up dated" by the previous delta X and delta Y information. In drawing one vector, and at the beginning of the next vector, the delta X and delta Y information is added by the computer into the X and Y registers by the adder by means of an add command from the control circuits in the computer such that the new vector will have the starting point Y plus delta Y, X plus delta X. This operation is produced in the conventional manner by the computer and through the normal arithmetic unit. The adders 134–136 may be part of the computer as well as the X, delta X, Y and delta Y registers. The new vector then has the starting point X plus delta X, Y plus delta Y and the components of the next vector which can be called, for the sake of description, delta X2 and delta Y2, then come into the delta X and delta Y registers, after this previous vector has been drawn.

The cathode ray tube beam will then be at the point Y plus delta Y plus delta Y2, and X plus delta X plus delta X2. At the end of the vector, delta X and delta Y information will be added to the X and Y registers as previously described and the process continues.

Since the starting point of each vector line segment is reestablished digitally, any error which occurs due to the D to A converters is not accumulated in the figure being drawn. The advantage of this is that if it is desired to draw a closed figure consisting of a number of line segments, the error in closing each line i.e. the errors mainly from delta X and delta Y, D to A converters, is spread throughout the figure instead of occurring all at once at the end of the figure thereby causing the figure to close poorly, e.g. with a gap. This illustrates the importance of two of the features of the present system which include the digital up-dating of the starting point of each line and the fact that each line is drawn with the same or substantially the same velocity. There is a slight marginal error due to the fact that when a delta X and delta Y component is provided, each component of the line controls certain capacitors in the two banks of capacitors 44 and 46, through the switch transistors. The effect therefore, is to add together the sum of all these capacitors. The distance or the length of a vector is equal to the square root of delta X squared plus delta Y squared, since distance is presumably proportional to time. Thus, the amount of capacitance is proportional to time since the more capacitance provided by the apparatus the longer it takes to have a ramp drawn, i.e. to have a ramp generated to a given potential with a given charging current. However, the total capacitance from the delta X side is added directly to the total capacitance from the delta Y side. If it is assumed that the total capacitance from delta X is $C_{delta\ X}$ and the capacitance from the Y side is $C_{delta\ Y}$ then the amount of capacitance connected in parallel for both delta X and delta Y is $C_{delta\ X}$ plus $C_{delta\ Y}$ and the amount of capacitance connected in parallel if it is desired that the time be proportional to distance should be the square root of $C_{delta\ X}$ squared plus $C_{delta\ Y}$ squared. The error aforementioned is most important at angles approaching 45° and maximizes at 45°. At approximately 45° the ratio of error to correct brightness is 1.414 to 1. However, on a cathode ray tube the eye can barely discern a 2 to 1 error in brightness. Since the error in brightness is significantly less than 2 to 1, this error is not meaningful i.e. it can be tolerated since it does not affect the length of the lines nor the angle or length of the vectors. It only effects the relative brightness of one vector relative to another vector. And since the eye cannot resolve the error, there is no real problem.

The comparator amplifier 60 which compares the amplitude of the output of the ramp amplifier with the reference supply potential changes state when the ramp amplifier output exceeds the reference supply. However, as soon as the discharge switch is energized and the output of the ramp amplifier begins to drop back toward ground, the output of the comparator amplifier also goes back to its original state. This would cause the discharge switch to turn off. However, the output of the comparator amplifier is used to trigger a flip-flop in the blanking and control circuits. This flip-flop is then used to control the discharge switch 52 and therefore the discharge switch is energized until the flip-flop is reset, which is not until the beginning of a new ramp. The new ramp begins after the delta X and delta Y information has been put into the line generator and sufficient settling time has been allowed for the ramp generator and other circuitry to settle. At this time the flip-flop of the blanking control circuit is reset which disables the discharge switch and allows the current to flow into the capacitors controlled by the switch transistors, and a new ramp is started.

The ramp continues to rise until it reaches the reference supply voltage at which point the blanking control flip-flop is set and the discharge switch once more is enabled. The output of the flip-flop that controls the discharge switch is also used to control the input of the blanking amplifier 88 which controls the beam current into the cathode ray tube in order that the retrace due to discharge of the ramp generator and changes in the registers are not seen on the cathode ray tube. The tube is kept blank except at those times when a vector is actually being drawn on the face of the tube. Therefore, the flip-flop which is in one state only during the time when the ramp is being drawn can be used to control the blanking amplifier. The comparator amplifier is sensitive to approximately 10 millivolts of change and thus when the ramp goes to approximately 10 millivolts or up to such amplitude that the comparator amplifier changes state the ramp generator is switched off and thus it never exceeds the reference supply. The display cathode ray tube used with this apparatus may be either of the magnitude or electrostatic deflection type.

What is claimed is:

1. A line generator for tracing information on a cathode ray tube at a constant velocity comprising:

a source of digital data, (a) X and Y register means for receiving starting point digital data from said source, a source of reference input voltage, deflection means for deflecting the beam of a cathode ray tube, binary to ramp function generator means operably associated with said reference voltage source to act as a source of ramp input voltage, (b) X and Y digital to analog converter means for receiving the reference input voltage connected respectively to said X and Y resgisters, for providing X and Y output voltages whose amplitudes are controlled by said digital data and which, when applied to said deflection means is effective to establish a starting point for a line segment of a desired pattern to be drawn on the screen of said tube, (c) ΔX and a ΔY register means for receiving segment digital data, (d) ΔX and a ΔY digital to analog converter means for receiving the ramp input voltage connected respectively to said ΔX and ΔY registers, for providing ΔX and YΔ ramp output voltages whose amplitudes are controlled by said segment digital data, adder means connected to said ΔX and ΔY register means for updating the starting point information in said X and Y register means as line segment information is changed, and (e) X and Y summing means for mixing X plus ΔX and Y plus ΔY output voltages from said converts for providing X and Y deflection levels for application to the deflection system of said cathode ray tube effective to draw a trace on the screen of said tube at a constant velocity.

2. A line generator as defined in claim 1 wherein the output ramp voltages from said ΔX and ΔY converters are either inverted or directly furnished to said summing means under control of a sign bit direction means so as to permit the X and Y components of said line segments to be in a first or a second direction.

3. A line generator as defined in claim 1 including a plurality of ΔX and ΔY weighted capacitors and individual switching means, a constant current charging source connected to one end of said capacitors and the other end of said capacitors having their return path to said charging source controlled by said individual switching means, circuit means causing said individual switching means to be open or closed in accordance with the segment data entered into said ΔX and ΔY registers, the voltage waveform generated by the charging of certain ones of said capacitors being connected as said ramp input voltage for ΔX and ΔY converters.

4. A line generator as defined in claim 3 further including comparator means and wherein said generated voltage waveform is also applied to said comparator means for comparison against the reference voltage level for providing a control signal indicating that a comparison between said D.C. reference voltage level and said ramp voltage level has been reached by said comparator means.

5. A line generator as defined in claim 4 including blanking and control signal means effective to cause said cathode ray tube to be blanked and to discharge said weighted capacitors.

6. A line generator as defined in claim 1 including an X and Y adder for adding the starting point digital data to the segment digital data after which the blanking and control signal means blanks the cathode ray tube for the end of the segment being traced and means for entering the sum of said digital values into said X and Y registers so as to provide an updated starting point for the beginning of the trace of a succeeding ΔX or ΔY line segment.

7. Apparatus for the generation of complex patterns on a cathode ray tube comprising:

(a) input storage means for receiving digital information representative of the initial X and Y starting position of a line to be drawn on said cathode ray tube, (b) digital to analog converters for producing an analog voltage output in response to said digital information in said storage means, (c) input storage means for receiving digital information representative of the ΔX and ΔY component lengths of the line to be traced on said cathode ray tube, (d) digital to analog converters for providing an analog voltage the output amplitude of which is controlled by said digital information from said last named storage means, (e) means operably associated with said ΔX and ΔY input storage means and said ΔX and ΔY D to A converters for adding the starting point digital data from said X and Y register means and the segment digital data from said ΔX and ΔY register means as the data is traced on the cathode ray tube providing an updated starting point for tracing the line of a prescribed length and angle on said cathode ray tube, (f) means for summing the voltages from the first mentioned digital to analog converters and said second mentioned digital to analog converters, and, (g) means including switch means for said cathode ray tube to which the summed voltages are fed for causing the beam of the cathode ray tube to be deflected and progressively advanced thereby to produce a pattern on the face of said tube.

8. Apparatus for the generation of complex patterns on a cathode ray tube comprising:

(a) first input bit storage registers for receiving digital information representative of the initial X and Y starting position of a line to be drawn on a cathode ray tube, (b) first digital to analog converters for producing analog voltage output in response to said digital information in said first storage registers, (c) second input bit storage registers for receiving digital information representative of the ΔX and ΔY component lengths of the line to be drawn on said cathode ray tube, (d) second digital to analog converters for providing an analog voltage the output amplitude of which is controlled by said digital information from said second storage registers, (e) means operably associated with said ΔX and ΔY input storage registers and said ΔX and ΔY D to A converters for adding the starting point digital data from said X and Y registers and the digital information from the ΔX and ΔY registers as the data is traced on the cathode ray tube providing an updated starting point for tracing the line of a prescribed length and angle on said cathode ray tube, (f) means for summing the voltages from the first mentioned digital to analog converters and the second digital to analog converters, and, (g) deflection amplifier means to which the summed voltages are fed for switching the beam of the cathode ray tube in a manner causing the beam to be deflected and progressively advanced thereby to produce a pattern on the face of said tube.

9. Apparatus for the generation of complex patterns on a cathode ray tube comprising:

(a) first input storage means for receiving digital information representative of the initial X and Y starting position of a line to be drawn on a cathode ray tube, (b) first digital to analog converters for producing analog voltage output in response to said digital information in said storage means, (c) second input storage means for receiving digital information representative of the ΔX and ΔY component lengths of the line to be drawn on said cathode ray tube, (d) second digital to analog converters for providing an analog voltage in response to said digital information from said last named storage means, (e) ramp generator means operably associated with said second input storage means and the ΔX and ΔY. D to A converters for adding the starting point digital information from the X and Y registers and the digital information from the ΔX and ΔY registers as the information is being traced on the cathode ray tube providing an updated starting point for tracing the line on the cathode ray tube, (f) means to provide a selected polarity to the output voltage of said second digital to analog converters in accordance with the angular direction of each compenent length of the line segment to be traced on said cathode ray tube, (g) means for algebraically summing the voltages from the first mentioned digital to analog converters and said second digital to analog converters, and (h) deflection amplifier means to which the summed voltage are fed for causing the beam of the cathode ray tube to be deflected and progressively advanced thereby to produce a pattern on the face of said tube.

10. Apparatus for the generation of complex patterns on a cathode ray tube comprising:

(a) a first plurality of input bit storage registers for receiving digital information representative of the initial X and Y starting position of a line to be drawn on a cathode ray tube, (b) a first plurality of digital to analog converters for producing an analog voltage output whose magnitude is controlled in response to said digital information in said registers, (c) a second plurality of input registers for receiving digital information representative of the ΔX and ΔY component lengths of the line to be drawn on the cathode ray tube, (d) a second plurality to analog converters for providing an analog voltage whose magnitude is controlled in response to said digital information from said second named input registers, (e) ramp generating apparatus for said plurality of digital to analog converters under control of said ΔX and ΔY registers for adding the starting point digital information from the X and Y registers and the digital information from the ΔX and ΔY registers as the trace on the tube is being made providing an updated starting point effective to establish and control the direction of trace of the line relative to its origin, (f) means for algebraically summing the voltages from the first mentioned digital to analog converters and said second digital to analog converters, (g) deflection amplifier means to which the summed voltages are fed, and, (h) control means to which the deflection amplifier output is connected for causing the beam of said cathode ray tube to be deflected and progressively advanced while producing a line on the face thereof.

11. Apparatus for the generation of complex patterns on a cathode ray tube comprising:

(a) a first pair of input registers for receiving digital information representative of the initial X and Y starting position of a line to be drawn on a cathode ray tube, (b) a first pair of digital to analog converters for producing an analog voltage output in response to said digital information in said registers, (c) a second pair of input registers for receiving digital bits of information representative of the magnitude and direction of the line to be drawn on the cathode ray tube, (d) a second pair of digital to analog converters for providing an analog voltage in response to said digital information from said second set of registers, (e) ramp generating means including a plurality of capacitors binary weighted to the bits of said second pair of input registers under control of said second pair of registers of adding the starting point digital information from the first pair of input registers and the second pair of input registers as the trace on the tube is being made providing an updated starting point, a source of constant charging current for said ramp generating means, (f) a plurality of solid state switch means operably associated therewith for controlling the charging of selected ones of said capacitors from said constant current charging source, (g) sign bit circuit means for each of said second pair of digital to analog converters effective to establish a proper direction of the line relative to its origin on the cathode ray tube, (h) means for summing the voltages from the pairs of digital to analog converters relative to the sign bit circuit means, (i) deflection amplifier means to which the summed voltages are fed from the summing amplifier, and (j) cathode ray tube display means to which the deflection amplifier output is connected for causing the beam of the cathode ray tube to be deflected and progressively advanced while a line is generated on the face thereof.

12. Apparatus for the generation of complex patterns on a cathode ray tube comprising:

(a) a first pair of input registers for receiving digital information representative of the initial X and Y starting position of a line to be drawn on a cathode ray tube, (b) a first pair of digital to analog converters for producing an analog voltage output in response to said digital information in said registers, (c) a second pair of input registers for receiving digital bits of information representative of the magnitude and direction of the line to be drawn on the cathode ray tube, (d) a second pair of digital to analog converters for providing an analog voltage in response to said digital information from said second set of registers, (e) ramp generating means including a first and a second plurality of capacitors, the capacitors being binary weighted to the bits of the input registers, said ramp generator means under control of said second pair of input registers for adding the starting point digital information from the first pair of input registers and said second pair of input registers as the trace is being made providing updated trace starting point to establish the proper direction of the line being drawn on the cathode ray tube, a source of constant charging current for said ramp generating means, (f) corresponding first and second pluralities of switch transistors for returning selected ones of said capacitors to ground effective to control the charging of selected ones of said capacitors from a constant current charging source, (g) sign bit circuit means for each pair of digital to analog converters effective to establish a proper direction of the line relative to its point of origin on the cathode ray tube, (h) means for summing the voltages from the pairs of digital to analog converters relative to the sign bit circuit means, (i) deflection amplifier means to which the summed voltages are fed from the summing amplifiers, and, (j) cathode ray tube display means to which the deflection amplifier output is connected for causing the beam of the cathode ray tube to be deflected and progressively advanced while a line is generated on the face thereof.

13. Apparatus for the generation of complex patterns on a cathode ray tube comprising:

(a) input storage means for receiving digital information representative of the initial X and Y starting position of a line to be drawn on a cathode ray tube, (b) digital to analog converters for producing an analog voltage output in response to said digital information in said storage means, (c) input storage means for receiving digital information representative of the X and Y component length of the line to be drawn on said cathode ray tube, (d) digital to analog converters for providing an analog voltage in response to said digital information from said last named storage means, reference voltage means, charging current means for said apparatus, (e) means for generating a voltage ramp upon the application of a current from said charging current means thereto for application to the digital to analog converters operably associated with the component length input storage means, (f) comparator means to which the output of said ramp generator means is fed and against which said reference voltage is compared, (g) discharge means for said ramp generating means controlled by said comparator means and effective to discharge said ramp generator means when the output of said ramp generator means and said reference voltage are coincident, (h) means operably associated with said storage means and said digital to analog converters for adding the starting point digital information from the X and Y registers and the digital information from the $\Delta X$ and $\Delta Y$ registers as the trace is being made providing an updated trace starting point to establish the proper directing of the line being drawn on the cathode ray tube, (i) means for summing the voltages from said first mentioned digital to analog converters and said second digital to analog converters, and (j) switching and control means to which the summed voltages are fed for causing the cathode ray tube beam to be deflected and progressively advanced thereby to produce a pattern on the face thereof.

14. Apparatus for the generation of complex patterns on a cathode ray tube comprising:

(a) input storage means for receiving digital information representative of the initial X and Y starting position of a line to be drawn on a cathode ray tube, (b) digital to analog converters for producing an analog voltage output in response to said digital information in said storage means, a source of line length information, (c) input storage means for receiving digital information representative of the $\Delta X$ and $\Delta Y$ component length of the line to be drawn on said cathode ray tube, (d) digital to analog converters for providing an analog voltage in response to said digital information from said last named storage means, a source of reference voltage, (e) means for generating a voltage ramp from said reference voltage for application to the digital to analog converters operably associated with the component length input storage means, comparator means, (f) means providing a fixed potential to which the output of said ramp generating means is compared by said comparator means, (g) means operably associated with said storage means and said digital to analog converters for adding the starting point digital information from the X and Y registers and the digital information from the $\Delta X$ and $\Delta Y$ registers as the trace is being made on the cathode ray tube providing an updated starting point to establish the proper direction of the line being drawn on the cathode ray tube, (h) means for summing the voltages from said first mentioned digital to analog converters and said second digital to analog converters, (i) means to which the summed voltages are fed for causing the cathode ray tube beam to be deflected and progressively advanced thereby to produce a pattern on the face thereof when said ramp generating means and said fixed potential are coincident, and, (j) means for adding new $\Delta X$ and $\Delta Y$ information to the contents of the X and Y input storage means and to said summing means thereby to update the information so as to provide an output from the summing means which is effective to continue the advance of the line being drawn on the CRT.

15. Apparatus for the generation of complex patterns on a cathode ray tube comprising:

a source of digital information, (a) input storage means for receiving digital information from said source representative of the initial X and Y starting position of a line to be drawn on a cathode ray tube, a source of reference voltage, (b) digital to analog converters for producing an analog voltage output from said source of voltage in response to said digital information in said storage means, (c) input storage means for receiving digital information representative of the X and Y component length of the line to be drawn on said cathode ray tube, (d) digital to analog converters for providing an analog voltage in response to said digital information from said last named storage means, (e) binary to ramp function generator means for generating a voltage ramp responsive to external command for application to the digital to analog converters operably associated with the component length input storage means, (f) sign bit circuit means operably associated with said digital to analog converters affective upon the application of an external command thereto to change the direction of the line being drawn on the cathode ray tube, (g) means for summing the voltages from said first mentioned digital to analog converters and said second digital to analog converters, (h) deflection and switching means to which the summed voltages are fed for causing the cathode ray tube beam to be deflected and progressively advanced effective to produce a pattern on the face thereof, and, (i) first and second adder means for introducing new line length and direction information into said input storage means for generating a new line segment and thereafter adding additional information into the registers and so on until the line pattern on the CRT is completed.

References Cited

UNITED STATES PATENTS

| | | | |
|---|---|---|---|
| 2,766,444 | 10/1956 | Sheftleman. | |
| 3,011,068 | 11/1961 | McVey. | |
| 3,047,851 | 7/1962 | Palmiter | 340—324.1 |
| 3,090,041 | 5/1963 | Dell | 340—324.1 |
| 3,158,857 | 11/1964 | Crosno et al. | |
| 3,205,488 | 9/1965 | Lumpkin | 340—324.1 |

NEIL C. READ, *Primary Examiner.*

A. J. KASPER, *Assistant Examiner.*